(12) United States Patent
Suzuki et al.

(10) Patent No.: US 8,654,628 B2
(45) Date of Patent: Feb. 18, 2014

(54) DATA CONTROL DEVICE, STORAGE DEVICE AND METHOD OF CONNECTING DATA CONTROL DEVICE

(75) Inventors: Seiji Suzuki, Kanagawa (JP); Manabu Akamatsu, Kanagawa (JP); Takeshi Kamimura, Kanagawa (JP); Junji Okada, Kanagawa (JP); Nobuo Mori, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 656 days.

(21) Appl. No.: 12/479,908

(22) Filed: Jun. 8, 2009

(65) Prior Publication Data

US 2010/0128597 A1    May 27, 2010

(30) Foreign Application Priority Data

Nov. 25, 2008 (JP) ................. 2008-299707

(51) Int. Cl.
 *G06F 11/00* (2006.01)
(52) U.S. Cl.
 USPC .......... 370/217; 370/216; 370/221; 714/6.22; 714/6.2
(58) Field of Classification Search
 USPC ................. 370/217, 221, 216; 714/6.22, 6.2
 See application file for complete search history.

(56) References Cited

U.S. PATENT DOCUMENTS

| | | | |
|---|---|---|---|
| 5,140,592 A | 8/1992 | Idleman et al. | |
| 5,274,645 A | 12/1993 | Idleman et al. | |
| 2006/0129784 A1 * | 6/2006 | Nakayama et al. | 711/170 |
| 2006/0190611 A1 | 8/2006 | Miyazaki et al. | |
| 2008/0162839 A1 * | 7/2008 | Nakamichi et al. | 711/159 |

FOREIGN PATENT DOCUMENTS

| | | |
|---|---|---|
| JP | 05-143471 | 6/1993 |
| JP | 05-197495 | 8/1993 |
| JP | 06-500186 | 1/1994 |
| JP | 06-149761 | 5/1994 |
| JP | 08-328760 | 12/1996 |
| JP | 2004-110528 | 4/2004 |
| JP | 2006-228078 | 8/2006 |
| JP | 2009-508192 | 2/2009 |
| JP | 2009-541853 | 11/2009 |
| JP | 2010-517172 | 5/2010 |
| WO | 2007/019527 | 2/2007 |
| WO | 2007/024740 | 3/2007 |
| WO | 2007/149472 | 12/2007 |
| WO | 2008/094495 | 8/2008 |

* cited by examiner

*Primary Examiner* — Omer S Mian
(74) *Attorney, Agent, or Firm* — Fildes & Outland, P.C.

(57) ABSTRACT

A data control device includes: a switch portion that has a plurality of first terminals on an upstream side, a plurality of second terminals on a downstream side, and a circuit portion that optionally switches a connection between the first terminals and the second terminals based on an external switching signal; and at least one control portion that has a first input/output portion on the upstream side and a second input/output portion on the downstream side, wherein the second input/output portion is connected to the first terminal of the switch portion and the first input/output portion is connected to the second terminal of the switch portion, and wherein the at least one control portion controls an input/output of data between the first input/output portion and the second input/output portion.

2 Claims, 12 Drawing Sheets

DATA CONTROL DEVICE, STORAGE DEVICE AND METHOD OF CONNECTING DATA CONTROL DEVICE

CROSS-REFERENCE TO RELATED APPLICATION

This application is based on and claims priority under 35 USC 119 from Japanese Patent Application No. 2008-299707 filed Nov. 25, 2008.

BACKGROUND

Technical Field

The present invention relates to a data control device, a storage device and a method of connecting the data control device.

SUMMARY

According to an aspects of the invention, a data control device includes: a switch portion that has a plurality of first terminals on an upstream side, a plurality of second terminals on a downstream side, and a circuit portion that optionally switches a connection between the first terminals and the second terminals based on an external switching signal; and at least one control portion that has a first input/output portion on the upstream side and a second input/output portion on the downstream side, wherein the second input/output portion is connected to the first terminal of the switch portion and the first input/output portion is connected to the second terminal of the switch portion, and wherein the at least one control portion controls an input/output of data between the first input/output portion and the second input/output portion.

According to the aspects of the invention, various connecting configurations between the storage portion and the control portion may be implemented by a single device.

BRIEF DESCRIPTION OF THE DRAWINGS

Exemplary embodiments of the invention will be described in detail based on the following figures, wherein.

DETAILED DESCRIPTION

A storage device according to an exemplary embodiment of the invention includes a switch portion having plural of first terminals provided on an upstream side, plural of second terminals provided on a downstream side, and a circuit portion for optionally switching a connecting state between the first terminals and the second terminals based on an external switching signal, at least one control portion having a first input/output portion provided on the upstream side and a second input/output portion provided on the downstream side, the second input/output portion being connected to the first terminal of the switch portion and the first input/output portion being connected to the second terminal of the switch portion, and serving to control an input/output of data between the first input/output portion and the second input/output portion, and plural of storage portions connected to the second terminals of the switch portion.

An upper device may be connected to the first terminal of the switch portion or the first input/output portion of the control portion.

With the structure, the second input/output portion of the control portion is connected to the first terminal of the switch portion, the storage portions and the first input/output portion of the control portion are connected to the second terminal of the switch portion, and a connecting state between the first and second terminals in the circuit portion can be switched optionally.

For example, in the case in which the connecting state of the circuit portion is switched to connect the storage portions to one of the control portions, it is possible to implement a connecting configuration having a hierarchical structure in which the storage portions are disposed on the downstream side of the control portion. Moreover, it is possible to implement a connecting configuration having a hierarchical structure in which the other control portion is disposed on the downstream side of the control portion in the case in which the connecting state of the circuit portion is switched to connect the other control portion to the single control portion, and it is possible to implement a connecting configuration having a hierarchical structure in which the control portion and the storage portion are disposed on the downstream side of the control portion in the case in which the connecting state of the circuit portion is switched to connect the other control portion and the storage portion to the single control portion. In the case in which the three connecting configurations are combined, it is possible to implement a connecting configuration of a hierarchical structure having plural of layers through the storage device.

First Exemplary Embodiment

Figure 1:
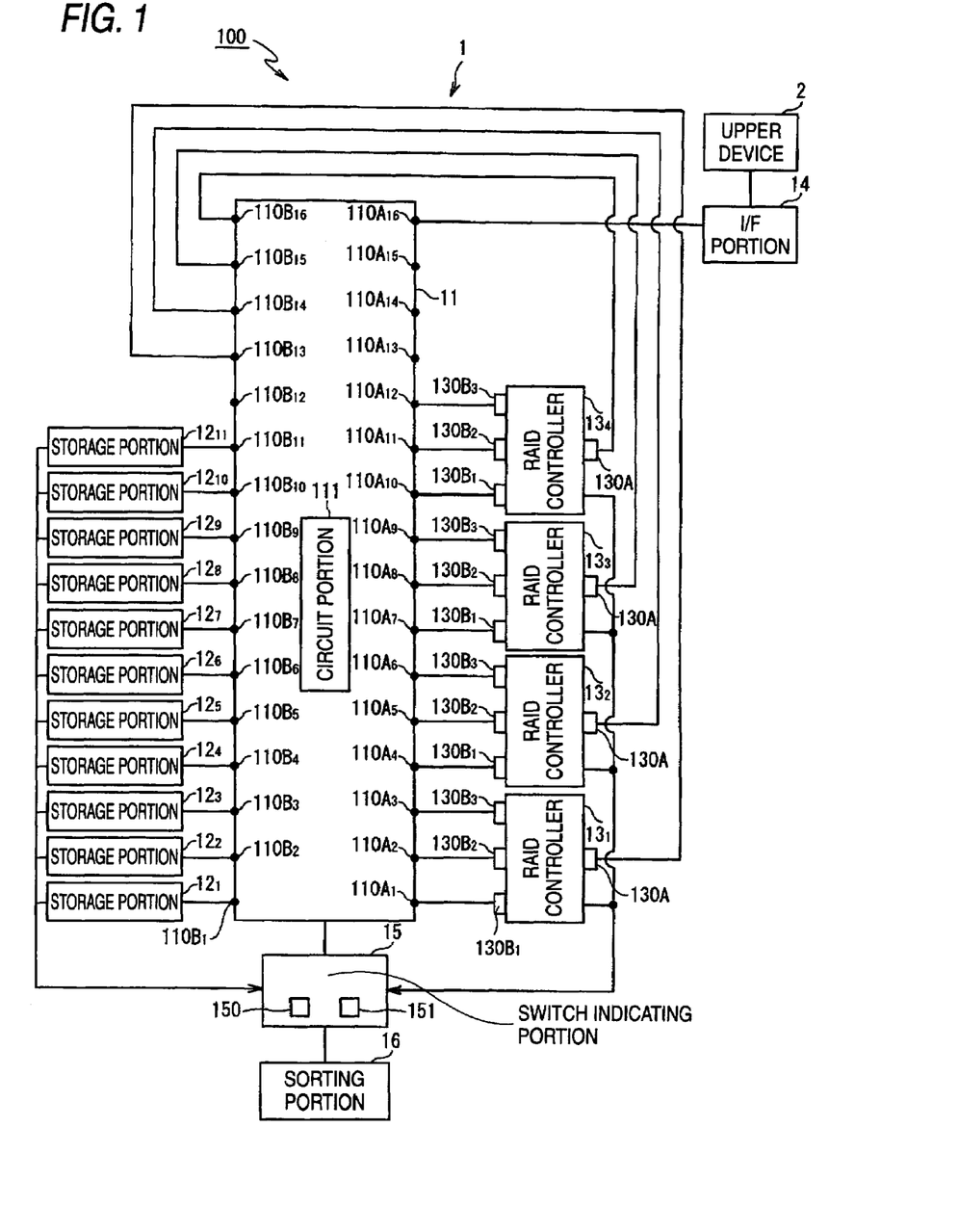
FIG. 1 is a block diagram showing an example of a schematic structure of a storage system according to a first exemplary embodiment of the invention.

FIG. 1 is a block diagram showing an example of a schematic structure of a storage system according to a first exemplary embodiment of the invention. A storage system 100 is constituted with a storage device 1 connected to an upper device 2.

(Upper Device)

The upper device 2 serves to give the storage device 1 a request for writing or reading data. The upper device 2 is constituted by a server, a computer (PC) and a work station (WS), for example.

The upper device 2 is connected to the storage device 1 in accordance with interface standards such as serial ATA, USB, SAS, a fiber channel, an infini band, PCI, Express, IDE or SCSI. The upper device 2 includes a port to be connected to a communication network such as a local area network (LAN) or Internet and may be connected to another host device or a terminal device through the port.

(Storage Device)

The storage device 1 includes a crossbar switch portion (a switch portion) 11, plural of storage portions $12_1$ to $12_{11}$, plural of RAID controllers (control portions) $13_1$ to $13_4$, an interface (I/F) portion 14, a switch indicating portion 15, and a sorting portion 16. The crossbar switch portion 11 and the RAID controllers $13_1$ to $13_4$ constitute a data control device.

(Crossbar Switch Portion)

The crossbar switch portion 11 has 16 first terminals $110A_1$ to $110A_{16}$ provided on an upstream side, 16 second terminals $110B_1$ to $110B_{16}$ provided on a downstream side, and a circuit portion 111 for optionally switching a connecting state of the first terminals $110A_1$ to $110A_{16}$ and the second terminals $110B_1$ to $110B_{16}$ based on an external switching signal. The crossbar switch portion 11 is constituted by a programmable logic device such as an FPGA (Field Programmable Gate Array). The numbers of the first and second terminals are not restricted to be 16.

The circuit portion 111 is an internal circuit of the crossbar switch portion 11 and has plural of transmission paths in a transverse direction which connect the first terminals $110A_1$ to $110A_{16}$ and the second terminals $110B_1$ to $110B_{16}$ in a one-on-one relationship, plural of transmission paths in a vertical direction which is disposed to cross the transmission paths in the transverse direction, and plural of switch circuits provided in positions in which the transmission paths in the vertical and transverse directions cross each other in a matrix, for example.

The circuit portion 111 changes a connecting state of the switch circuits based on connecting state information transmitted from the switch indicating portion 15 together with a switching signal sent from the switch indicating portion 15, thereby switching a connecting state between the first terminals $110A_1$ to $110A_{16}$ and the second terminals $110B_1$ to $110B_{16}$ optionally.

(Raid Controller)

Each of the RAID controllers $13_1$ to $13_4$ has a single first input/output portion 130A provided on an upstream side and three second input/output portions $130B_1$ to $130B_3$ provided on a downstream side. The number of the RAID controllers provided in the storage portion 1 is not restricted to be three but may be one or more. Moreover, the number of the second input/output portions is not restricted to be three but may be one or more and the numbers of the second input/output portions between the respective RAID controllers may be different from each other.

The RAID controllers $13_1$ to $13_4$ control an input/output of data between the first input/output portion 130A and the second input/output portions $130B_1$ to $103B_3$. For a method of controlling data, for example, various data control methods such as RAIDs 0 to 6 are applied. Different control methods may be applied to the respective RAID controllers, for example, the RAID 1 may be applied to the RAID controllers $13_1$ to $13_3$ and the RAID 5 may be applied to the RAID controller $13_4$.

The second input/output portions $130B_1$ to $130B_3$ possessed by the RAID controller $13_1$ are connected to the first terminals $110A_1$ to $110A_3$ of the crossbar switch portion 11, respectively. Similarly, the second input/output portions $130B_1$ to $130B_3$ possessed by the RAID controller $13_2$ are connected to the first terminals $110A_4$ to $110A_6$ respectively, the second input/output portions $130B_1$ to $130B_3$ possessed by the RAID controller $13_3$ are connected to the first terminals $110A_7$ to $110A_9$ respectively, and the second input/output portions $130B_1$ to $130B_3$ possessed by the RAID controller $13_4$ are connected to the first terminals $110A_{10}$ to $110A_{12}$ respectively.

Moreover, the first input/output portion 130A possessed by the RAID controller $13_1$ is connected to the second terminal $110B_{13}$ of the crossbar switch portion 11. Similarly, the first input/output portion 130A possessed by the RAID controller $13_2$ is connected to the second terminal $110B_{14}$, the first input/output portion 130A possessed by the RAID controller $13_3$ is connected to the second terminal $110B_{15}$, and the first input/output portion 130A possessed by the RAID controller $13_4$ is connected to the second terminal $110B_{16}$.

(I/F Portion)

The I/F portion 14 is connected to the upper device 2 and is connected to the first terminal $110A_{16}$ of the crossbar switch portion 11, and serves to transmit/receive data together with the upper device 2. The I/F portion 14 may be connected to the first input/output portions 130A possessed by the RAID controllers $13_1$ to $13_4$.

(Storage Portion)

The storage portions $12_1$ to $12_{11}$ are connected to the second terminals $110B_1$ to $110B_1$ of the crossbar switch portion 11 respectively and data are written and read. For the storage portions $12_1$ to $12_{11}$, a volatile semiconductor memory such as a DRAM or a nonvolatile semiconductor memory such as a flash memory is used, for example. The storage portions $12_1$ to $12_{11}$ may be a hard disk using a magnetism or an optical disk such as a DVD, or may employ other storage methods. Moreover, the storage method may be varied between plural of storage portions.

(Switch Indicating Portion)

The switch indicating portion 15 includes path calculation indicating unit 150 and path change indicating unit 151 and is implemented by a CPU, for example.

When accepting an initializing signal for giving a notice of a purport that an instruction for executing an initialization is sent or a fault occurring signal for giving a notice of the purport that a fault is detected from the storage portions $12_1$ to $12_{11}$ and the RAID controllers $13_1$ to $13_4$, the path calculation indicating unit 150 gives an instruction for calculating connecting state information to the sorting portion 16 in order to change a connecting state of the crossbar switch portion 11. The initializing signal is transmitted from an operating portion (not shown) to the switch indicating portion 15 in the case in which a user carries out a changing work for attaching, removing and exchanging the storage portion or the case in which the user wants to change a connecting configuration even if the changing work is not performed, for example.

The path change indicating unit 151 transmits, to the crossbar switch portion 11, connecting state information to be a calculating result obtained by the sorting portion 16 and gives an instruction for switching the connecting state to the crossbar switch portion 11.

(Sorting Portion)

Figure 2A:
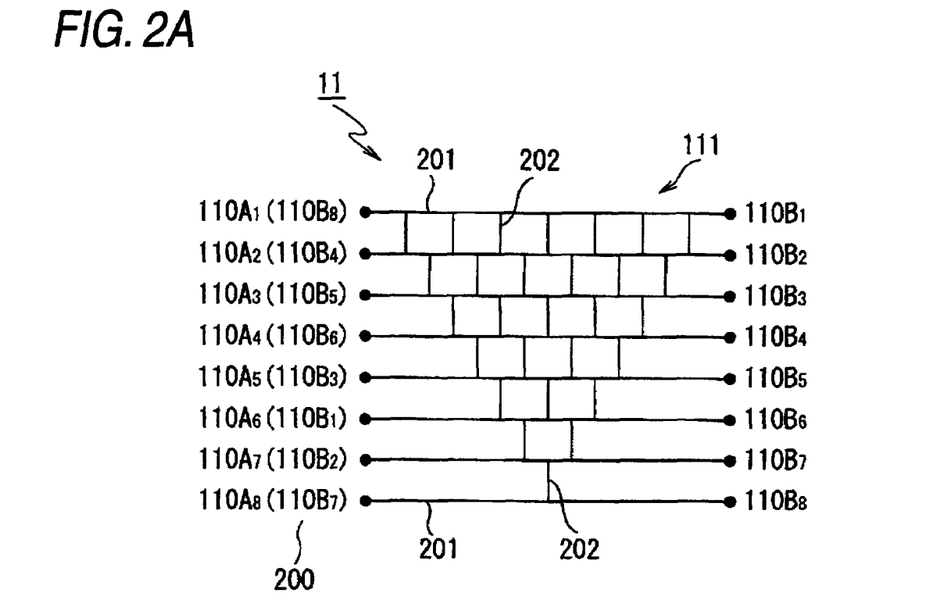
FIG. 2A is a diagram showing an example of the case in which connecting state information of a circuit portion through bubble sort is calculated.
Figure 2B:
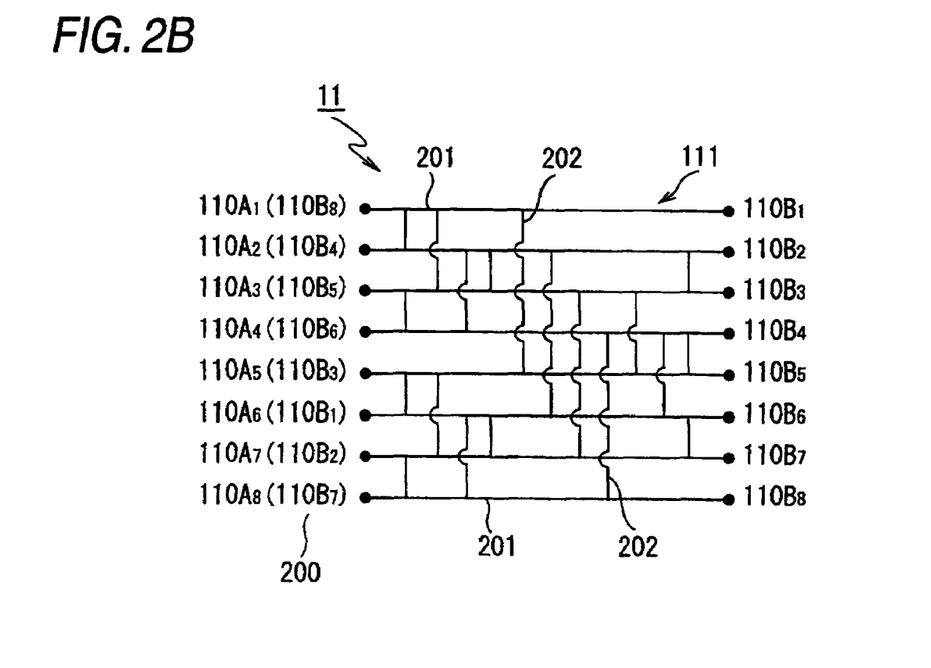
FIG. 2B is a diagram showing an example of the case in which connecting state information of the circuit portion through Odd-Even Merge Sort is calculated.

The sorting portion 16 calculates connecting state information based on the instruction given from the path change indicating unit 151. The sorting portion 16 is implemented by a CPU for executing a program employing various algorithms for a sort processing, for example. An example of the sort processing in the calculation of the connecting state information will be described below with reference to FIGS. 2A and 2B. In FIGS. 2A and 2B, the numbers of the first and second terminals are set to be eight, respectively.

FIG. 2A is a diagram showing an example of the case in which connecting state information of the circuit portion is calculated by bubble sort. By using a bubble sorting algorithm, the circuit portion 111 expresses, in a net-like diagram, a connecting state in which each of the first terminals is connected to a terminal 200 to be a connecting destination in the second terminals. In the bubble sort, the terminals corresponding to a transverse line 201 are compared with each other and a vertical line 202 is sequentially added in such a manner that a greater terminal number is set onto a lower side in FIG. 2A.

For instance, two transverse lines 201 on an upper side will be taken as an example. Since a terminal to be a connecting destination of the first terminal $110A_1$ is the second terminal $110B_8$ and a terminal to be a connecting destination of the first terminal $110A_2$ is the second terminal $110B_4$, the vertical line 202 is added. The operation for adding the vertical line 202 is repetitively carried out so that a connecting state shown in FIG. 2A is calculated.

FIG. 2B is a diagram showing an example of the case in which the connecting state information of the circuit portion is calculated through Odd-Even Merge Sort to be a type of parallel sort. The circuit portion 111 calculates the same connecting state as that in FIG. 2A by using an algorithm for the Odd-Even Merge Sort.

The connecting state in the bubble sort has N! patterns in total if the numbers of the first and second terminals are set to be "N", and the number of comparisons is N(N−1)/2. A limit value of a size of the connecting state information is approximately log 2(N!) bits. When the number of the terminals is 256, the limit value is 1685 bits and the size of the connecting state information of the bubble sort is 32385 bits.

On the other hand, the Odd-Even Merge Sort has a smaller number of comparisons than the bubble sort, that is, O(n log $n^2$), and the size of the connecting state information is 3839 bits which are close to the limit value when the number of the terminals is 256.

(Method of Connecting Each Portion of Storage Device)

Next, a method of connecting the crossbar switch portion 11, the four RAID controllers $13_1$ to $13_4$ and the eleven storage portions $12_1$ to $12_{11}$ in the storage device 1 will be described with reference to FIG. 1.

First of all, the crossbar switch portion 11, the four RAID controllers $13_1$ to $13_4$ and the eleven storage portions $12_1$ to $12_{11}$ are prepared.

As shown in FIG. 1, subsequently, the second input/output portions $130B_1$ to $130B_3$ possessed by the RAID controllers $13_1$ to $13_4$ are connected to the first terminals $110A_1$ to $110A_{12}$ possessed by the crossbar switch portion 11, respectively.

Then, the first input/output portions 130A possessed by the RAID controllers $13_1$ to $13_4$ are connected to the second terminals $110B_{13}$ to $110B_{16}$ possessed by the crossbar switch portion 11, respectively.

Thereafter, the eleven storage portions $12_1$ to $12_{11}$ are connected to the second terminals $110B_1$ to $110B_{11}$ possessed by the crossbar switch portion 11, respectively. By connecting the respective portions as described above, the storage device 1 illustrated in FIG. 1 is constituted.

(Operation According to the First Exemplary Embodiment)

Next, an example of an operation of the storage system 100 will be described with reference to FIGS. 3 to 9.

(1) Switching of Connecting State in Initialization

When a power supply of the storage device 1 is turned ON so that an initializing operation is carried out by the operating portion, for example, the path calculation indicating unit 150 of the switch indicating portion 15 accepts an initializing signal from the operating portion.

Then, the path calculation indicating unit 150 transmits, to the sorting portion 16, structure information indicative of a connecting configuration implemented by the storage device 1, and gives an instruction to the sorting portion 16 in order to calculate the connecting state information based on the structure information.

Figure 3:
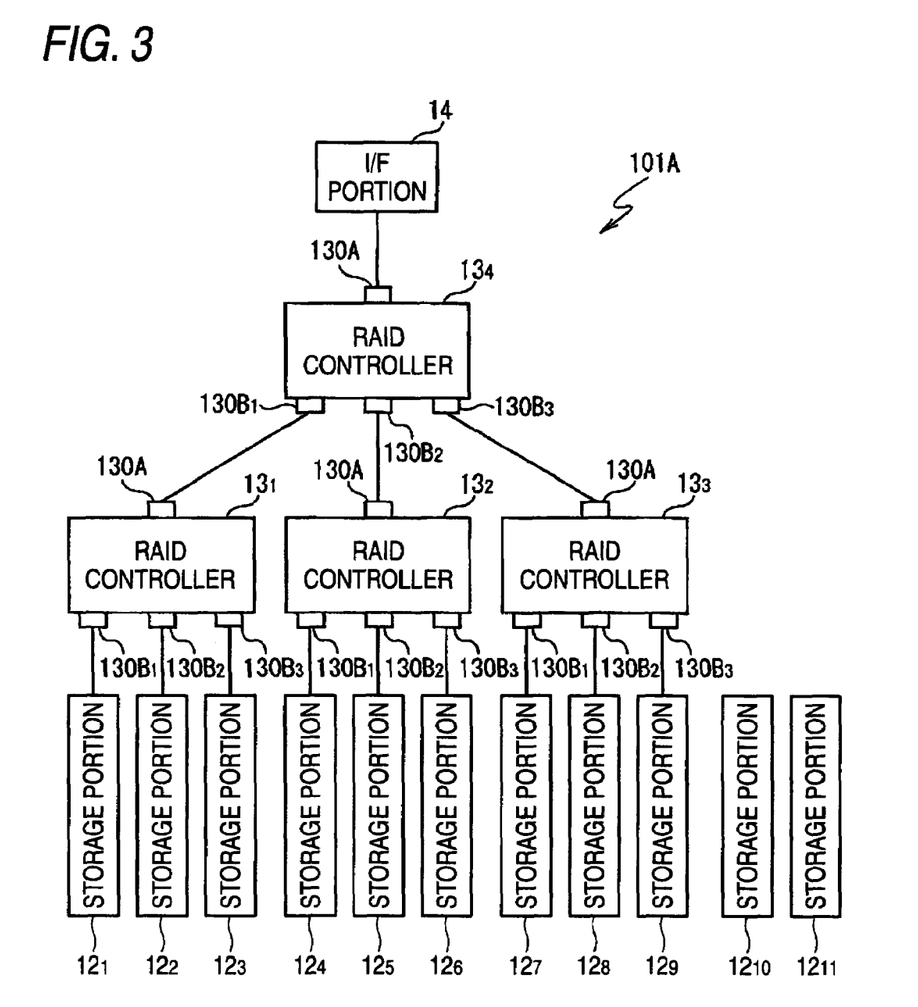
FIG. 3 is a diagram showing an example of a connecting configuration which is implemented by a storage device.

FIG. 3 is a diagram showing an example of a connecting configuration implemented by the storage device. A connecting configuration 101A has a hierarchical structure having four layers. In the hierarchical structure, the I/F portion 14 is disposed on an uppermost layer, the RAID controller $13_4$ connected to the I/F portion 14 is disposed on a second layer provided thereunder, and the three RAID controllers $13_1$ to $13_3$ connected to the RAID controller $13_4$ are disposed on a third layer provided thereunder. Furthermore, the three storage portions $12_1$ to $12_3$ connected to the RAID controller $13_1$, the three storage portions $12_4$ to $12_6$ connected to the RAID controller $13_2$, and the three storage portions $12_7$ to $12_9$ connected to the RAID controller $13_3$ are disposed on a fourth layer (a lowermost layer) provided thereunder. The storage portions $12_{10}$ and $12_{11}$ are spare storage portions and are not connected to the RAID controller.

The structure information to be transmitted to the sorting portion 16 is information obtained by recording the connecting configuration 101A illustrated in FIG. 3 and having the second terminal to be the connecting destination to the first terminal which is designated.

Next, the sorting portion 16 carries out a calculation based on the structure information transmitted from the path calculation indicating unit 150 and transmits, to the switch indicating portion 15, connecting state information to be a result of the calculation.

Upon receipt of the connecting state information from the sorting portion 16, subsequently, the path change indicating unit 151 of the switch indicating portion 15 transmits the connecting state information to the crossbar switch portion 11 and sends a switching signal to switch the connecting state to the crossbar switch portion 11.

Upon receipt of the switching signal, then, the crossbar switch portion 11 switches the connecting state of the circuit portion 111 based on the connecting state information.

Figure 4:
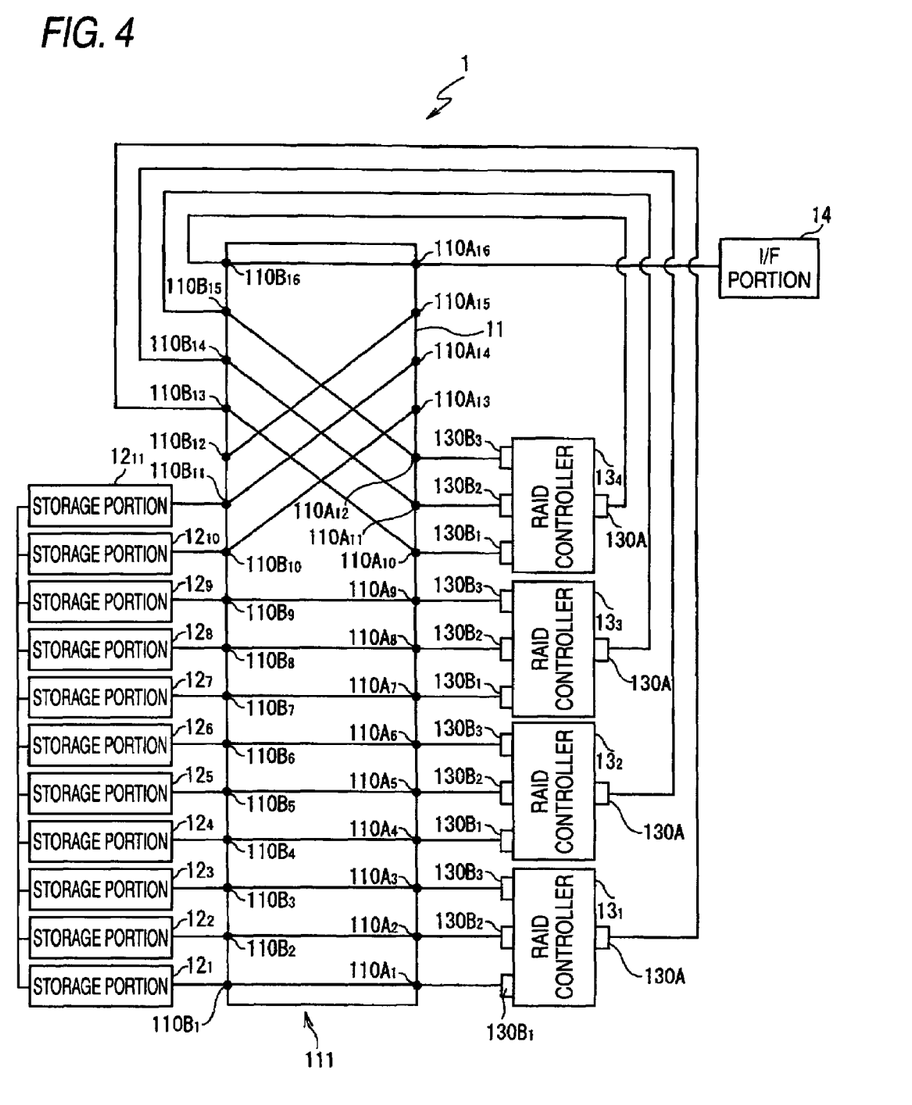
FIG. 4 is a diagram showing an example of a connecting state of a crossbar switch portion which implements the connecting configuration illustrated in FIG. 3.

FIG. 4 is a diagram showing an example of the connecting state of the crossbar switch portion which implements the connecting configuration illustrated in FIG. 3. In FIG. 4, for simplicity of explanation, the first terminal and the second terminal are connected in a straight line through the circuit portion 111 of the crossbar switch portion 11.

In the circuit portion 111 of the crossbar switch portion 11, the first terminal $110A_{16}$ and the second terminal $110B_{16}$ are connected to each other in order to dispose the RAID controller $13_4$ on a downstream side of the I/F portion 14, and the first terminals $110A_{10}$ to $110A_{12}$ and the second terminals $110B_{13}$ to $110B_{15}$ are connected to each other in order to dispose the RAID controllers $13_1$ to $13_3$ on a downstream side of the RAID controller $13_4$. In the circuit portion 111, moreover, the first terminals $110A_1$ to $110A_9$ and the second terminals $110B_1$ to $110B_9$ are connected to each other in order to dispose the storage portions $12_1$ to $12_9$ in a division every three parts on a downstream side of the RAID controllers $13_1$ to $13_3$.

Moreover, the second terminals $110B_{10}$ and $110B_{11}$ to which the spare storage portions $12_{10}$ and $12_{11}$ are connected are connected to the first terminals $110A_{13}$ and $110A_{14}$ to be empty terminals which are connected to neither the RAID controllers $13_1$ to $13_4$ nor the I/F portion 14. Furthermore, the second terminal $110B_{12}$ to be an empty terminal which is not connected to the storage portion is connected to the first terminal $110A_{15}$ to be an empty terminal.

In FIG. 4, for example, when following a flow of data to the storage portion $12_1$ through the I/F portion 14 to be a first layer from the upper device 2, the flow passes through the RAID controller $13_4$ as a second layer, passes through the RAID controller $13_1$ as a third layer and reaches the storage portion $12_1$ to be a fourth layer so that a coincidence with the connecting configuration 101A illustrated in FIG. 3 is obtained.

(2) Switching of Connecting State with Fault occurring in Storage Portion

Figure 9:
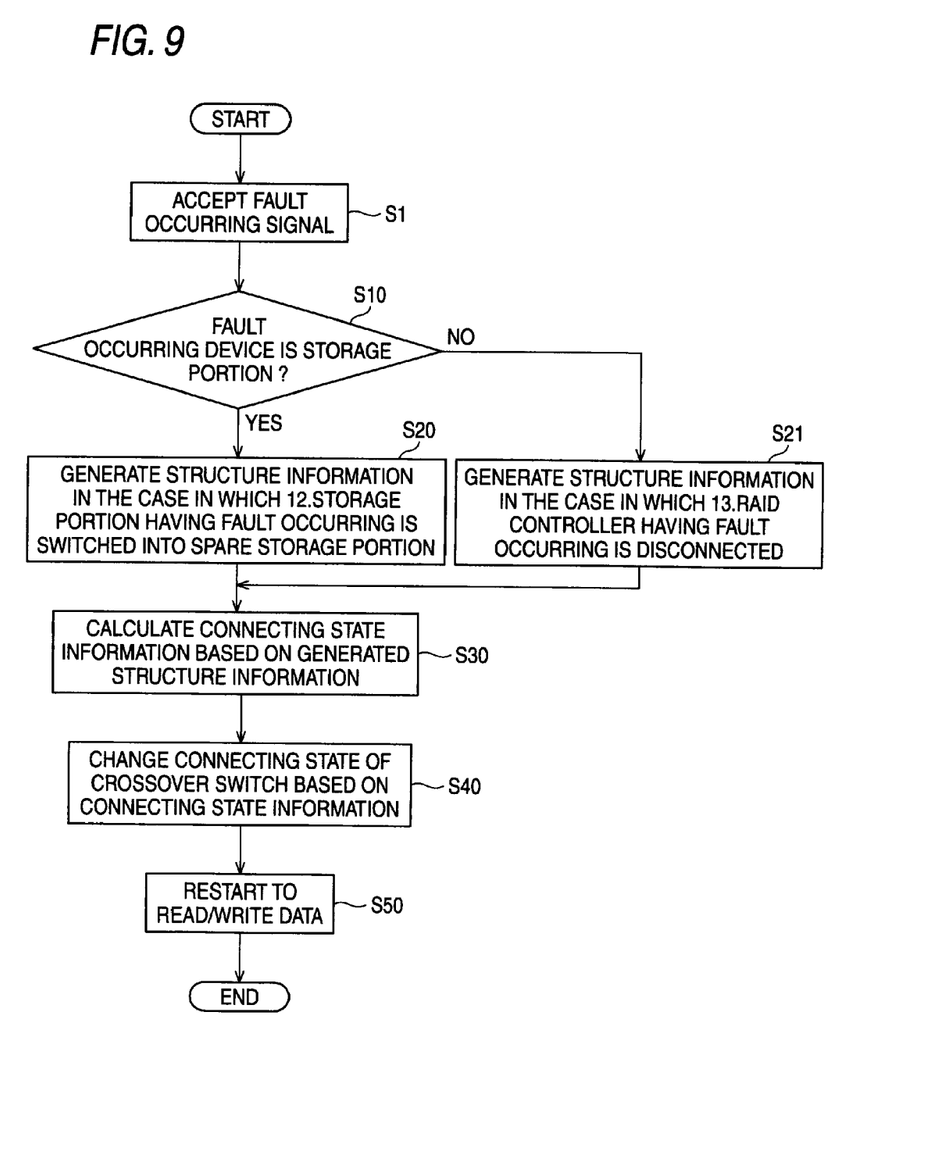
FIG. 9 is a flowchart showing an example of an operation of the storage device in the occurrence of a fault.

An operation in the case in which a fault occurs in the storage portion $12_6$, for example, in a state in which the crossbar switch portion 11 is operated based on the connecting state illustrated in FIG. 4 will be described in accordance with a flowchart of FIG. 9 with reference to FIGS. 5 and 6.

First of all, when detecting the occurrence of the fault, the storage portion $12_6$ sends a fault occurring signal indicative of the purport to the switch indicating portion 15 and the path calculation indicating unit 150 of the switch indicating portion 15 accepts the fault occurring signal (S1).

If a device in which the fault occurs is the storage portion (S10: Yes), next, the path calculation indicating unit 150 generates structure information about switching into the spare storage portion $12_{10}$ in place of the storage portion $12_6$ (S20) and transmits the structure information to the sorting portion 16, and gives an instruction for calculating connecting state information.

Figure 5:
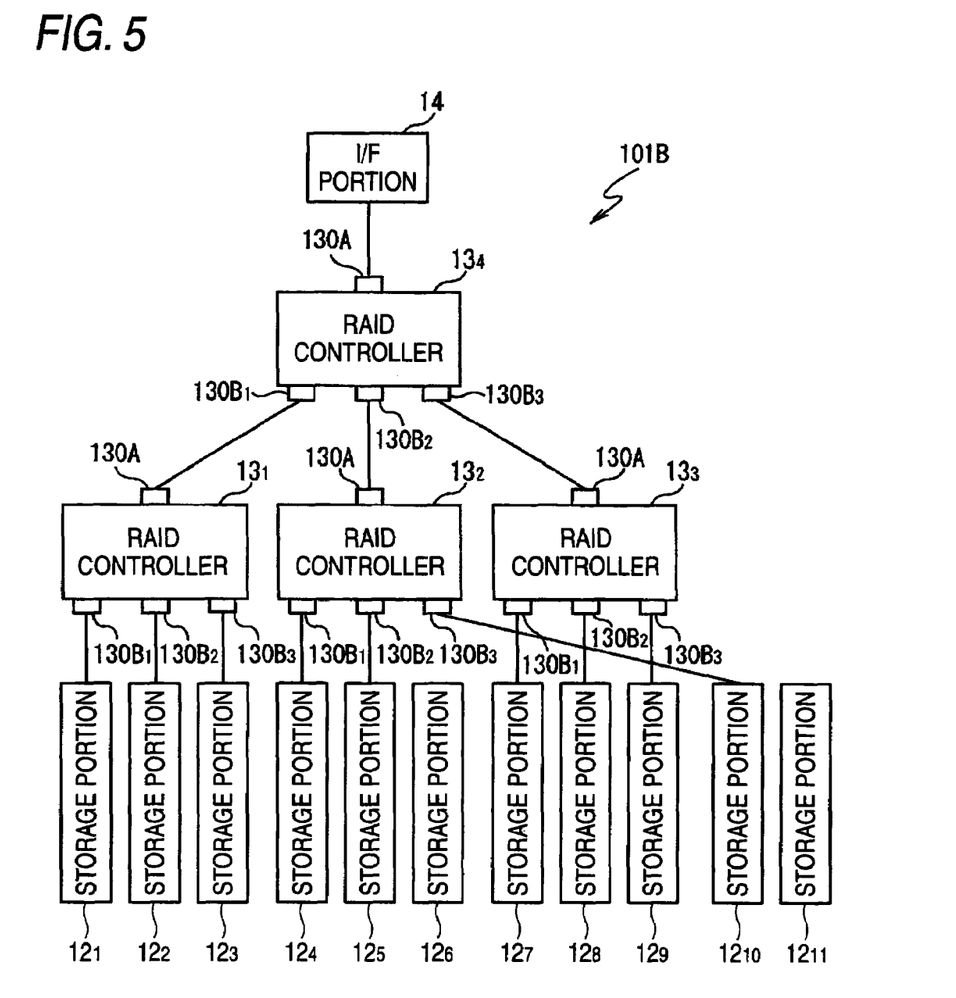
FIG. 5 is a diagram showing an example of a connecting configuration in the case in which switching into a spare storage portion is carried out.

FIG. 5 is a diagram showing an example of a connecting configuration in the case in which switching into the spare storage portion is carried out. A connecting configuration 101B is different from FIG. 3 in that the spare storage portion $12_{10}$ is connected to the RAID controller $13_2$ in place of the storage portion $12_6$.

When the sorting portion 16 carries out a calculation for the connecting state information (S30) and transmits connecting state information to be a result of the calculation to the switch indicating portion 15, next, the path change indicating unit 151 of the switch indicating portion 15 transmits a switching signal to the crossbar switch portion 11 in order to carry out switching into a connecting state indicated by the connecting state information. Upon receipt of the switching signal, then, the crossbar switch portion 11 switches the connecting state of the circuit portion 111 based on the connecting state information (S40).

Figure 6:
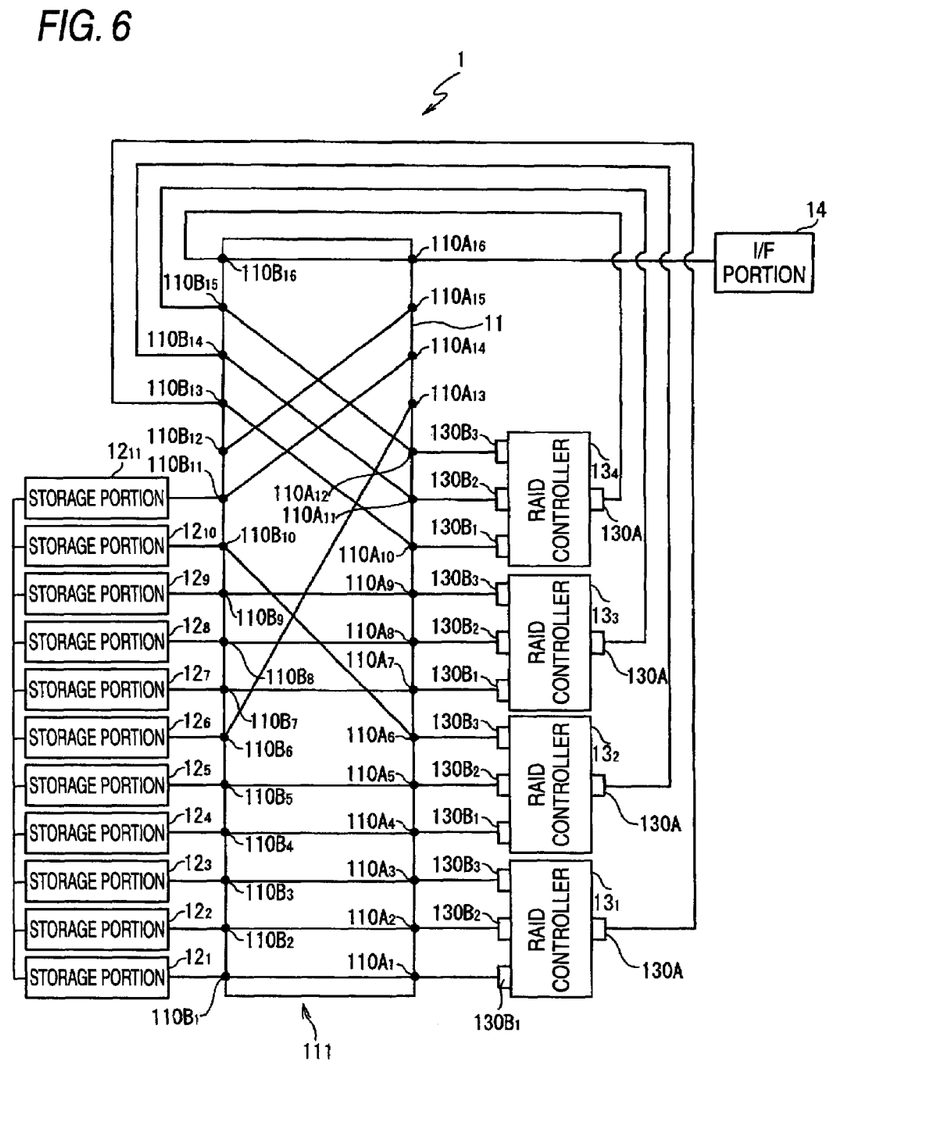
FIG. 6 is a diagram showing an example of a connecting state of the crossbar switch portion which implements the connecting configuration illustrated in FIG. 5.

FIG. 6 is a diagram showing an example of the connecting state of the crossbar switch portion which implements the connecting configuration illustrated in FIG. 5. The circuit portion 111 of the crossbar switch portion 11 is different from FIG. 4 in that the second terminal $110B_6$ connected to the storage portion $12_6$ in which a fault occurs is connected to the first terminal $110A_{13}$ and the first terminal $110A_{13}$ connected to the spare storage portion $12_{10}$ is connected to the second terminal $110B_6$.

Then, the storage device 1 restarts to read/write data based on a request given from the upper device 2 (S50). In the case in which the RAID controller $13_2$ applies a data control method of the RAID 5 before the data are restarted to be read and written, for example, the data stored in the storage portion $12_6$ in which the fault occurs may be restored (rebuilt) based on the data stored in the other storage portions $12_4$ and $12_5$ connected to the RAID controller $13_2$.

(3) Switching of Connecting State with Fault Occurring in RAID Controller

An operation to be carried out when a fault occurs in the RAID controller $13_3$, for example, in a state in which the crossover switch portion 11 is operated based on the connecting state illustrated in FIG. 4 will be described in accordance with the flowchart of FIG. 9 with reference to FIGS. 7 and 8.

First of all, when detecting the occurrence of the fault, the RAID controller $13_3$ transmits, to the switch indicating portion 15, a fault occurring signal indicative of the purport and the path calculation indicating unit 150 of the switch indicating portion 15 accepts the fault occurring signal (S1).

If a device in which the fault occurs is the RAID controller (S10: No), next, the path calculation indicating unit 150 generates structure information about a disconnection of the RAID controller $13_3$ in which the fault occurs (S21) and transmits the structure information to the sorting portion 16, and gives the sorting portion 16 an instruction for calculating connecting state information.

Figure 7:
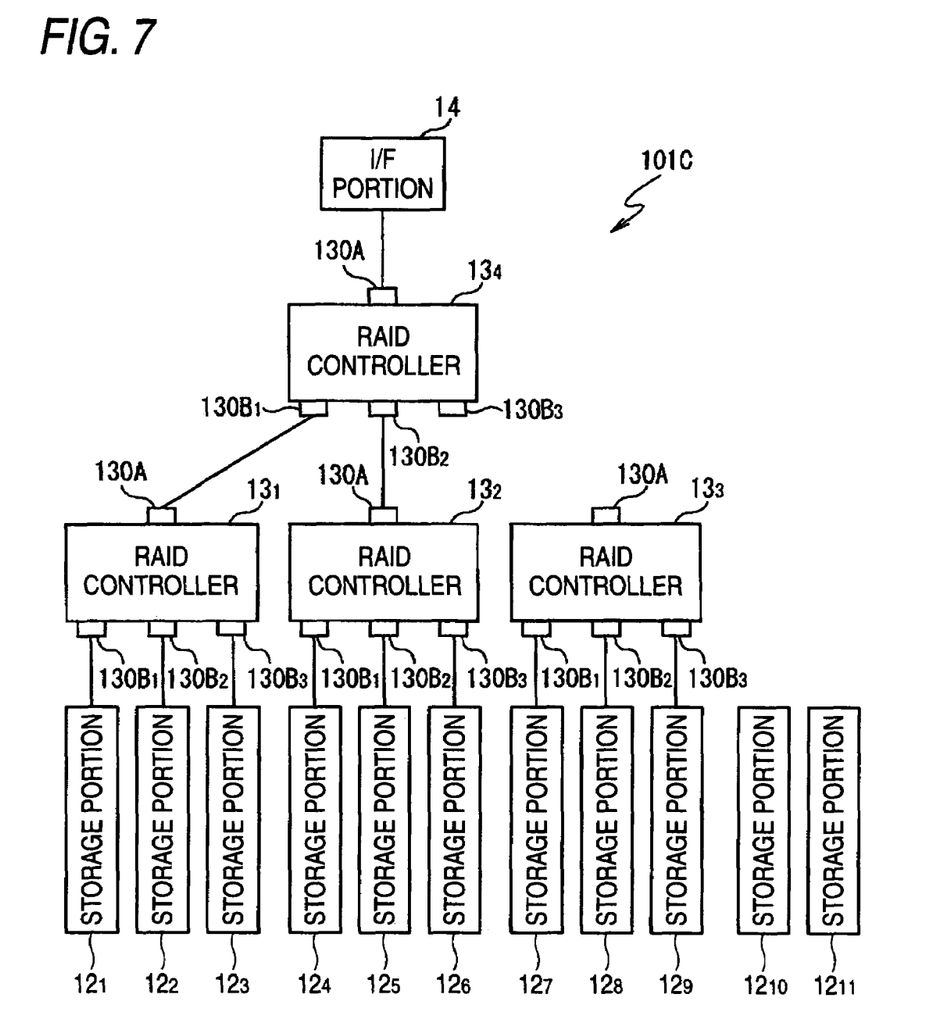
FIG. 7 is a diagram showing an example of a connecting configuration in the case of a disconnection of an RAID controller in which a fault occurs.

FIG. 7 is a diagram showing an example of a connecting configuration in the case of a disconnection of the RAID controller in which the fault occurs. A connecting configuration 101C is different from FIG. 3 in that the first input/output portion 130A of the RAID controller $13_3$ is not connected to the second input/output portion $130B_3$ of the RAID controller $13_4$.

Next, the connecting state information is calculated by the sorting portion 16 (S30). When a switching signal is transmitted to the crossbar switch portion 11 by the path change indicating unit 151, the crossbar switch portion 11 switches the connecting state of the circuit portion 111 based on the connecting state information (S40).

Figure 8:
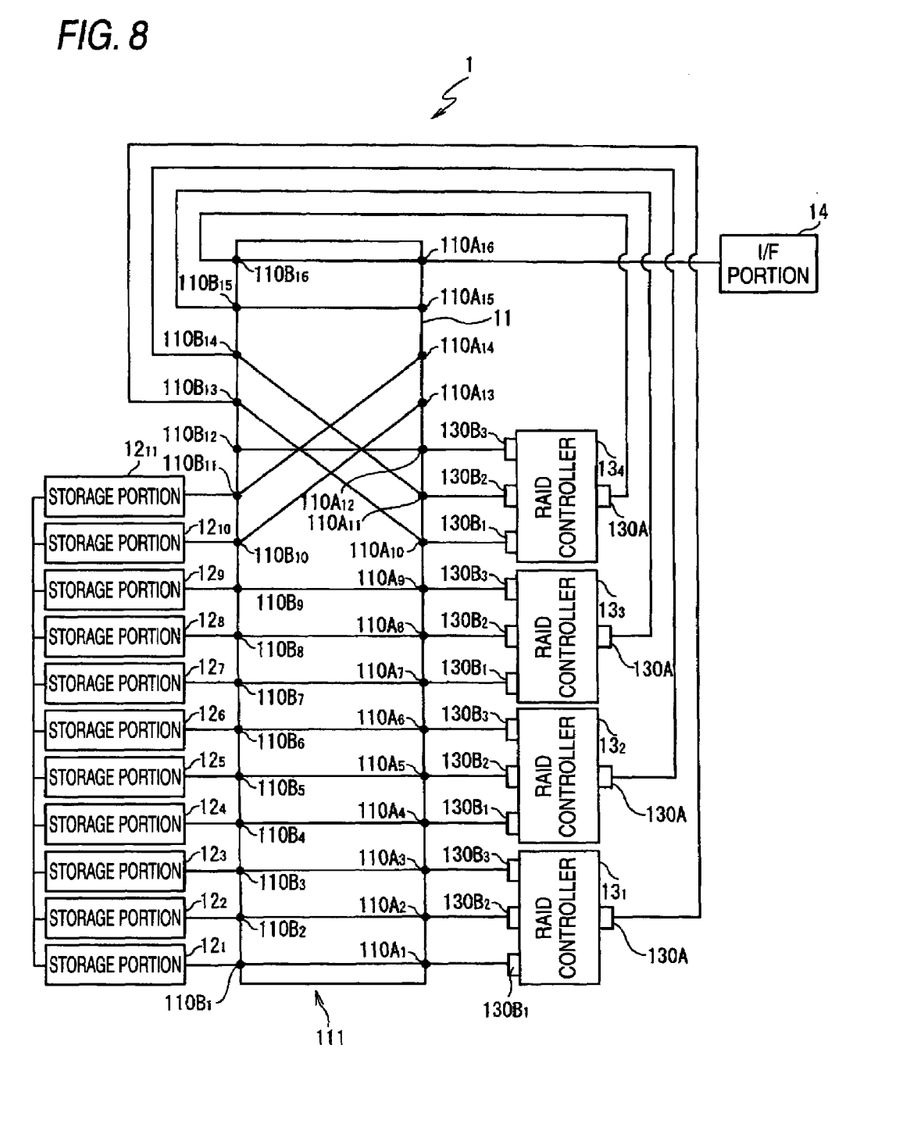
FIG. 8 is a diagram showing an example of a connecting state of the crossbar switch portion which implements the connecting configuration illustrated in FIG. 7.

FIG. 8 is a diagram showing an example of a connecting state of the crossbar switch portion which implements the connecting configuration illustrated in FIG. 7. The circuit portion 111 of the crossbar switch portion 11 is different from FIG. 4 in that the second terminal $110B_{15}$ connected to the first input/output portion 130A of the RAID controller $13_3$ in which the fault occurs is connected to the first terminal $110A_{15}$ to be an empty terminal and the first terminal $110A_{12}$ connected to the second input/output portion $130B_3$ of the RAID controller $13_4$ is connected to the second terminal $110B_{12}$ to be an empty terminal.

Then, the storage device 1 restarts to read and write data based on a request given from the upper device 2 (S50). The connecting configuration may be temporarily switched so as to read the data stored in the storage portions $12_7$ to $12_9$ connected to the RAID controller $13_3$ in which the fault occurs, for example, before restarting to read and write the data.

Second Exemplary Embodiment

Figure 10:
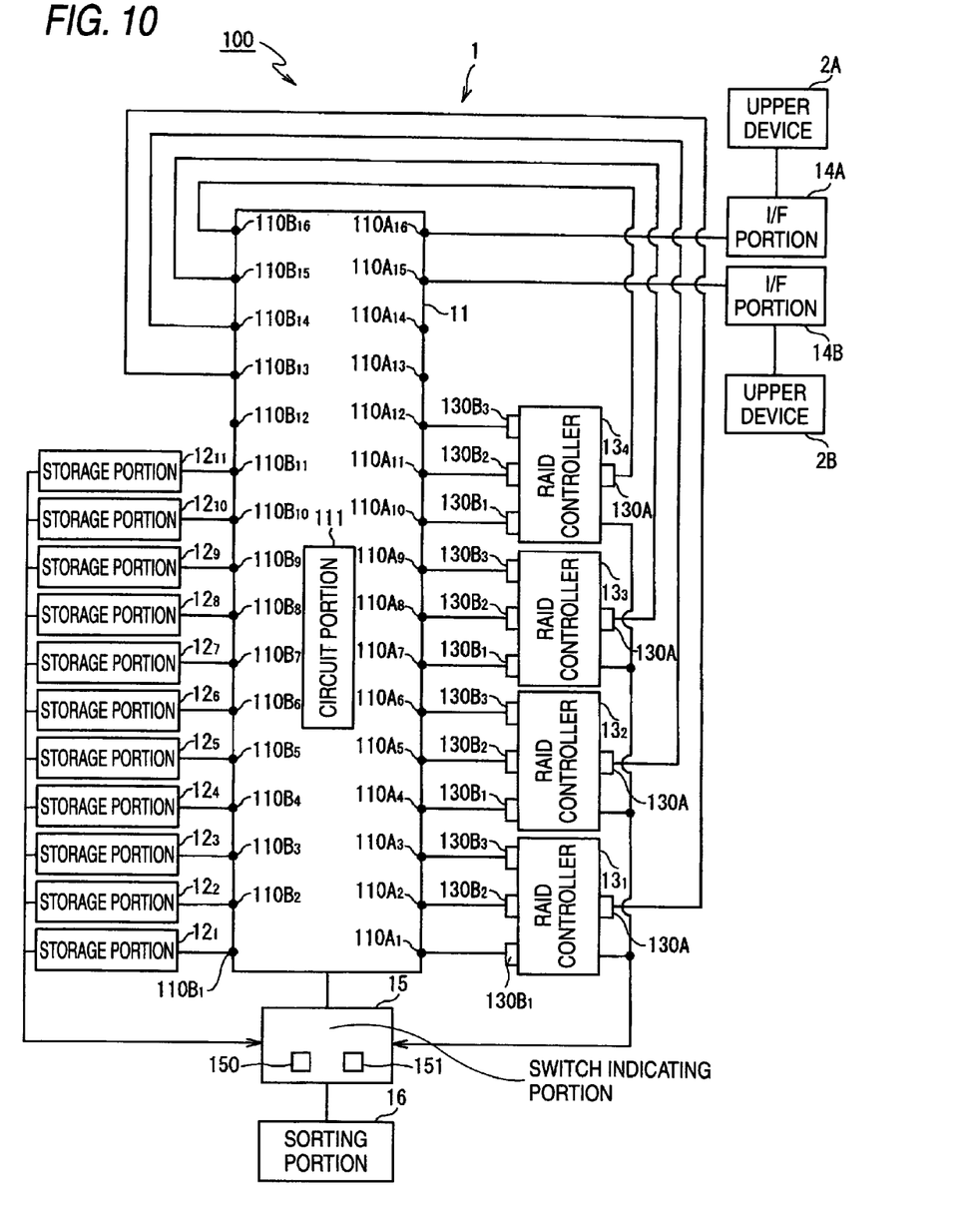
FIG. 10 is a block diagram showing an example of a schematic structure of a storage system according to a second exemplary embodiment of the invention.

FIG. 10 is a block diagram showing an example of a schematic structure of a storage system according to a second exemplary embodiment of the invention. A storage system 100 has a structure in which a storage device 1 is connected to two upper devices 2A and 2B. The two upper devices 2A and 2B are constituted in the same manner as in the first exemplary embodiment.

The storage device 1 according to the exemplary embodiment is different from that according to the first exemplary embodiment in that there are provided two I/F portions 14A and 14B connected to the two upper devices 2A and 2B respectively and the other structures are the same. The storage device 1 may include at least three I/F portions.

The I/F portion 14A is connected to a first terminal 110A$_{16}$ of a crossbar switch portion 11 and the I/F portion 14B is connected to a first terminal 110A$_{15}$ of the crossbar switch portion 11.

Figure 11:
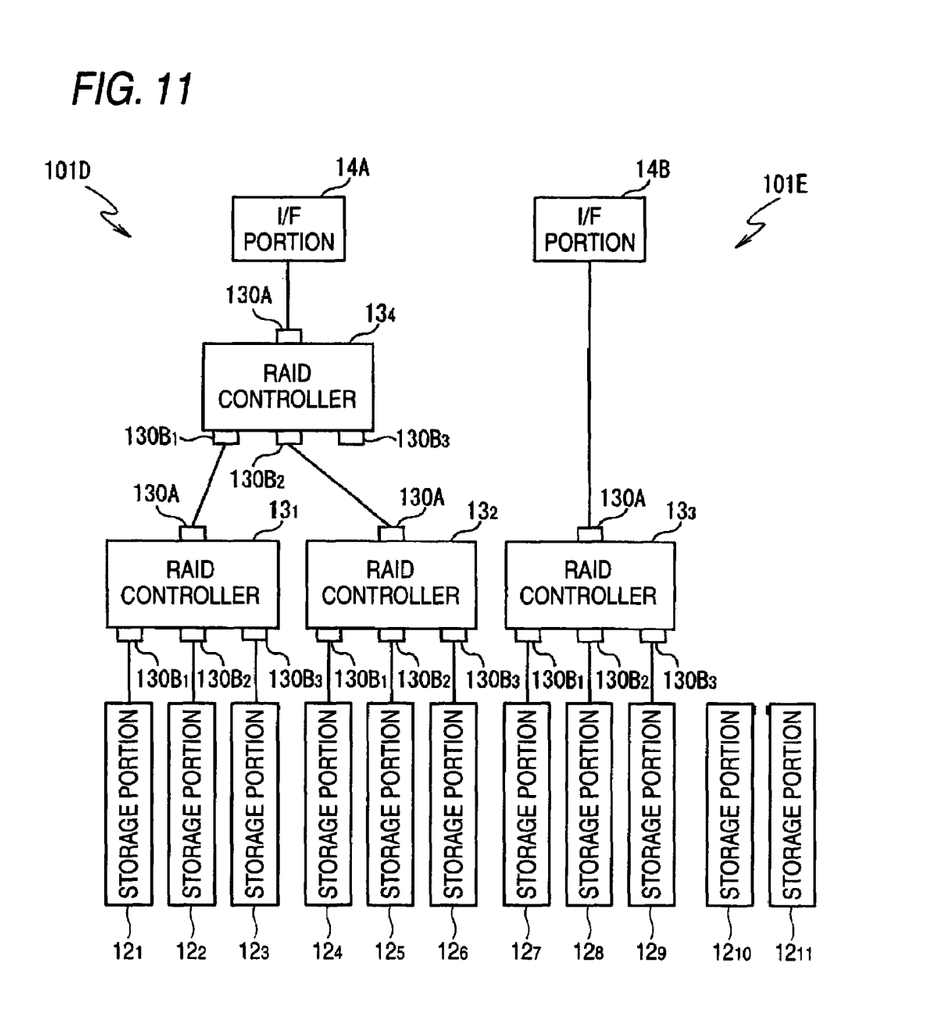
FIG. 11 is a diagram showing an example of two connecting configurations which are implemented by the storage device.

FIG. 11 is a diagram showing an example of two connecting configurations which are implemented by the storage device. In the storage device 1, there are implemented a connecting configuration 101D connected to the upper device 2A through the I/F portion 14A and a connecting configuration 101E connected to the upper device 2B through the I/F portion 14B.

The connecting configuration 101D has the same four-layer hierarchical structure as that in FIG. 3, and the I/F portion 14A is disposed on an uppermost layer, an RAID controller 13$_4$ is disposed on a second layer provided thereunder, two RAID controllers 13$_1$ and 13$_2$ are disposed on a third layer provided thereunder, and six storage portions 12$_1$ to 12$_6$ are disposed on a fourth layer (a lowermost layer) provided thereunder.

The connecting configuration 101E has a three-layer hierarchical structure, and the I/F portion 14B is disposed on an uppermost layer, an RAID controller 13$_3$ is disposed on a second layer provided thereunder and three storage portions 12$_7$ to 12$_9$ are disposed on a third layer (a lowermost layer) provided thereunder.

Figure 12:
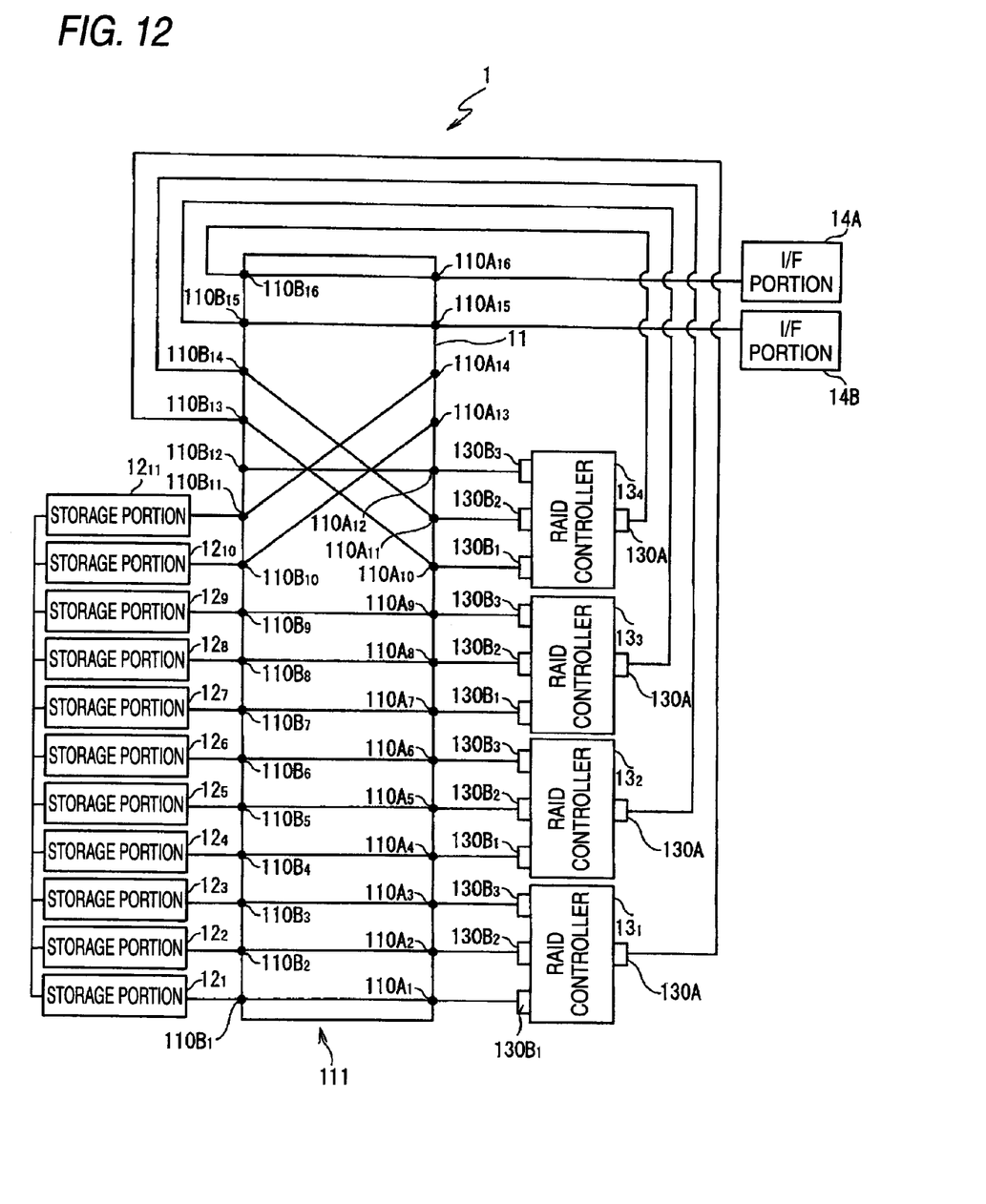
FIG. 12 is a diagram showing an example of a connecting state of the crossbar switch portion which implements the connecting configuration illustrated in FIG. 11.

FIG. 12 is a diagram showing an example of a connecting state of the crossbar switch portion which implements the connecting configuration illustrated in FIG. 11. In a circuit portion 111 of the crossbar switch portion 11, the first terminal 110A$_{16}$ and a second terminal 110B$_{16}$ are connected to each other in order to dispose the RAID controller 13$_4$ on a downstream side of the I/F portion 14A, first terminals 110A$_{10}$ and 110A$_{11}$ and second terminals 110B$_{13}$ and 110B$_{14}$ are connected to each other in order to dispose the two RAID controllers 13$_1$ and 13$_2$ on a downstream side of the RAID controller 13$_4$, and first terminals 110A$_1$ to 110A$_6$ and second terminals 110B$_1$ to 110B$_6$ are connected to each other in order to dispose the storage portions 12$_1$ to 12$_6$ in a division every three parts on a downstream side of the RAID controllers 13$_1$ and 13$_2$.

In the circuit portion 111, moreover, the first terminal 110A$_{15}$ and a second terminal 110B$_{15}$ are connected to each other in order to dispose the RAID controller 13$_3$ on a downstream side of the I/F portion 14B, and first terminals 110A$_7$ to 110A$_9$ and second terminals 110B$_7$ to 110B$_9$ are connected to each other in order to dispose the three storage portions 12$_7$ to 12$_9$ on a downstream side of the RAID controller 13$_3$.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various exemplary embodiments and with the various modifications as are suited to the particular use contemplated. It is intended that the scope of the invention be defined by the following claims and their equivalents.

What is claimed is:

1. A data control device comprising:

a switch device that has a plurality of first terminals on an upstream side, a plurality of second terminals on a downstream side, and an internal circuit that optionally switches a connection between the first terminals and the second terminals based on an external switching signal; and at least one controller that has a first input/output port on the upstream side and at least one second input/output port on the downstream side, wherein the at least one second input/output port is directly connected to one of the first terminals of the switch device and the first input/output port is directly connected to one of the second terminals of the switch device, and wherein the at least one controller controls an input/output of data between the first input/output port and the second input/output port;

wherein at least one of the first terminals of the switch device is connected to an upper device and the first input/output port of the at least one controller is connected to the upper device via the connection of the said one of the second terminals of the switch device with the first input/output port;

wherein the upper device transmits a request to read or write data from or to a first memory device, respectively;

wherein the first memory device is connected to one of the second terminals;

wherein the internal circuit of the switch device performs switching in response to detecting a fault in the first memory device on the basis of the external switching signal;

wherein the switching connects a second memory device to the one of the second terminals and disconnects the first memory device from the one of the second terminals; and wherein when a fault is detected in the at least one controller on the basis of the external switching signal, the internal circuit of the switch device performs switching to disconnect the at least one controller from at least the first or second memory device and a controller other than the at least one controller.

2. A storage device comprising:

a switch device that has a plurality of first terminals on an upstream side, a plurality of second terminals on a downstream side, and an internal circuit that optionally switches a connection between the first terminals and the second terminals based on an external switching signal; and at least one controller that has a first input/output port on the upstream side and at least one second input/output port on the downstream side, a plurality of memory devices that are connected to the second plurality of terminals of the switch device, wherein the at least one second input/output port is directly connected to one of the first terminals of the switch device and the first input/output port is directly connected to one of the second terminals of the switch device, and wherein the at least one controller controls an input/output of data between the first input/output port and the second input/output port;

wherein at least one of the first terminals of the switch device is connected to an upper device and the first input/output port of the at least one controller is connected to the upper device via the connection of the said one of the second terminals of the switch device with the first input/output port;

wherein the upper device transmits a request to read or write data from or to a first memory device, respectively;

wherein the first of the plurality of memory devices is connected to one of the second terminals;

wherein the internal circuit of the switch device performs switching in response to detecting a fault in the first of the plurality of memory devices on the basis of the external switching signal;

wherein the switching connects a second of the plurality of memory devices to the one of the second terminals and disconnects the first of the plurality of memory devices from the one of the second terminals; and wherein when a fault is detected in the at least one controller on the basis of the external switching signal, the internal circuit of the switch device performs switching to disconnect the at least one controller from the plurality of memory devices and a controller other than the at least one controller.

* * * * *